March 24, 1964 E. C. BITZER 3,126,090
ADJUSTABLE IDLER SUPPORT BRACKET FOR BELT CONVEYOR ASSEMBLIES
Filed May 10, 1961 2 Sheets-Sheet 1

INVENTOR.
EDMUND C. BITZER
BY
ATTORNEYS

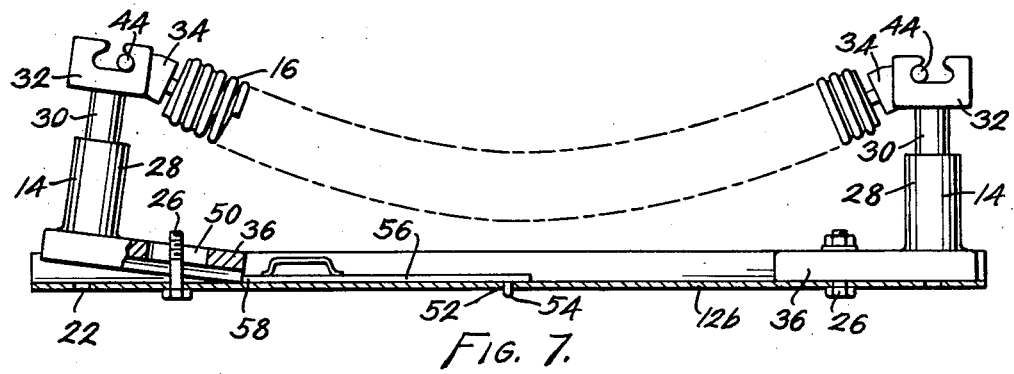
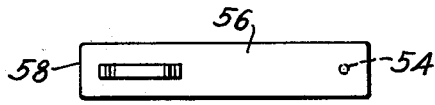
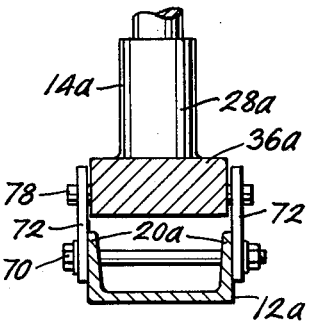
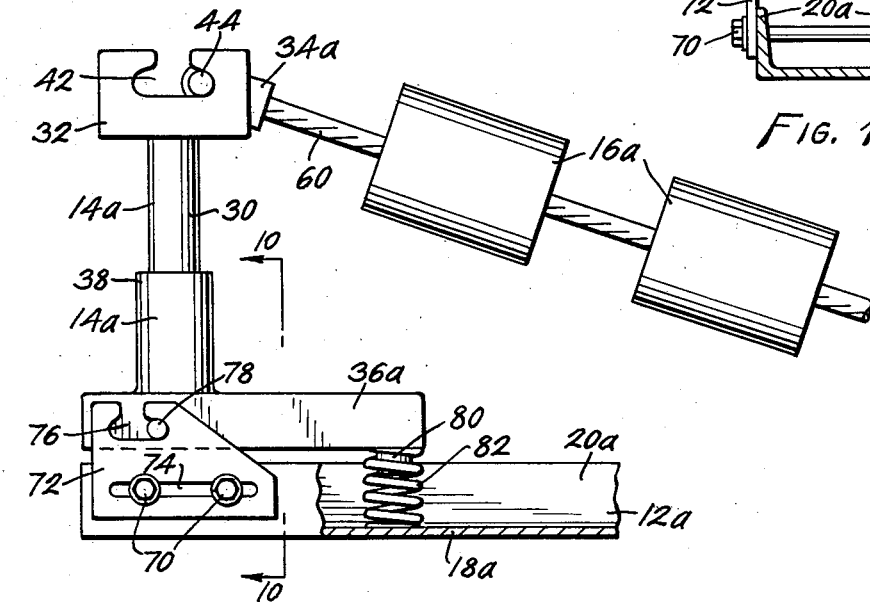

United States Patent Office 3,126,090
Patented Mar. 24, 1964

3,126,090
ADJUSTABLE IDLER SUPPORT BRACKET FOR BELT CONVEYOR ASSEMBLIES
Edmund C. Bitzer, 1118 18th St., Golden, Colo.
Filed May 10, 1961, Ser. No. 109,098
5 Claims. (Cl. 198—192)

This invention relates to belt conveyors and, more specifically, to adjustable idler support brackets therefor.

Belt conveyor idlers can be classified broadly into two basically different types, namely, those in which the idlers are fixedly mounted and the ones where the idlers are flexibly mounted. In the former, it is not possible to vary the depth of the trough formed in the belt by the idler assemblies as this remains fixed for a given idler design. As for the flexibly mounted idler assemblies of the latter type, on the other hand, some variation in the trough depth can be accomplished but, even in this instance, only on a more or less permanent basis.

Of the several flexible idler assemblies in use at the present time, three basically different designs are commonly employed. The first two both utilize a flexible cable suspended between a pair of fixed upright supports that carries a plurality of cylindrical idler elements arranged thereon in end to end relation. The difference between these two designs is that in one the idler elements are fixed on the cable while the cable is journalled for rotation at the supports; whereas, in the other, the cable is dead-ended at the supports and the idler elements are mounted on the cable for rotation. The third design dispenses with both the cable and cylindircal idler elements substituting therefor a close-wound helical spring support for rotation between a pair of rotatable plugs carried by the upright supports.

Now, it is well known that these flexible idler systems assume a catenary shape between the supports therefor which is relatively fixed depending upon the distance separating the supports and the length of cable or helical spring suspended therebetween. The desired trough depth for a belt conveyor of a given width, however, varies rather widely with different applications and this necessitates substantial modification of the idler assemblies to achieve the desired trough angle. Ordinarily this is accomplished in the case of the cable-type idler assemblies by cutting the cable to the length required to produce the desired trough depth, spacing the idlers along the cable and attaching the end fittings. In the case of the close-wound spring idlers, on the other hand, the spring must be cut to length with a torch or similar tool preparatory to attaching the end fittings. In both instances, there is little possibility for standardization and once the idler assemblies are cut to length and assembled, the trough depth remains fixed although it is quite possible that variations therein should be made in order to handle a given material more efficiently or adapt the unit to a variety of different materials.

Another problem peculiar to the coiled spring type idler is that of the difficulties encountered replacing a broken or damaged spring, especially with the belt resting thereon. Tensioning devices for this specialized purpose are seldom available around the user's facility and considerable down-time may be involved before the necessary repairs can be made by a servicing agency. Accordingly, it would be most advantageous to provide an idler assembly construction whereby the trough depth could be varied at will coupled with means by which spring idlers might be replaced rapidly and easily without the necessity of using special purpose equipment or techniques.

One of the most significant advantages of the spring-type idler is its ability to yield under the impact loads to which it is subjected at the feed end or loading stations of the conveyor. In the case of the cable-type idlers which ordinarily make no provision for shock absorption, this factor becomes a significant one in the repair and maintenance costs attributable to the conveyor.

It is, therefore, the principal object of the present invention to provide a novel and improved conveyor idler supporting structure adaptable for use with both the cable and close-wound helical spring types.

A second object is to provide a structure of the type aforementioned in which the trough depth of the conveyor belt can be varied at will by means of a simple adjustment.

Another objective of the invention herein disclosed is the provision of an idler assembly that can be standardized for a given belt width yet is not limited to any particular trough depth even though the idler element remains the same length.

Still another object is to provide a cable-type belt idler unit equipped with shock-absorbers adapted to yieldably and resiliently receive impact blows such as are realized during the loading operations.

An additional objective of the instant invention is the provision of an idler support assembly that includes as a part thereof a gage block adapted to accurately locate the upright post support elements in transverse spaced relation to one another while, at the same time, performing the added function of a removable fulcrum about which one of said post supports may be tilted toward the other for purposes of suspending the flexible idler unit therebetween.

Further objects are to provide a conveyor belt idler assembly that is compact, lightweight, inexpensive, versatile, trouble-free, rugged, simple and adaptable for use with any of the better known spring or cable-type idler unit designs.

Other objects will be in part apparent and in part pointed out specifically hereinafter in connection with the description of the drawings that follows, and in which:

FIGURE 7 is a front elevational view similar to FIGURE 1, portions of which have been broken away and shown in section, illustrating a modified form of base adapted for use with a gage block;

FIGURE 8 is a top plan view of the gage block used with the base design of FIGURE 7;

FIGURE 9 is a fragmentary front elevation to an enlarged scale showing a further modification of the invention incorporating a shock-absorbent connection between the base and post-support unit in addition to the adjustment feature, portions of the base having been broken away and shown in section; and, FIGURE 10 is a fragmentary section taken along line 10—10 of FIGURE 9.

Figure 1:
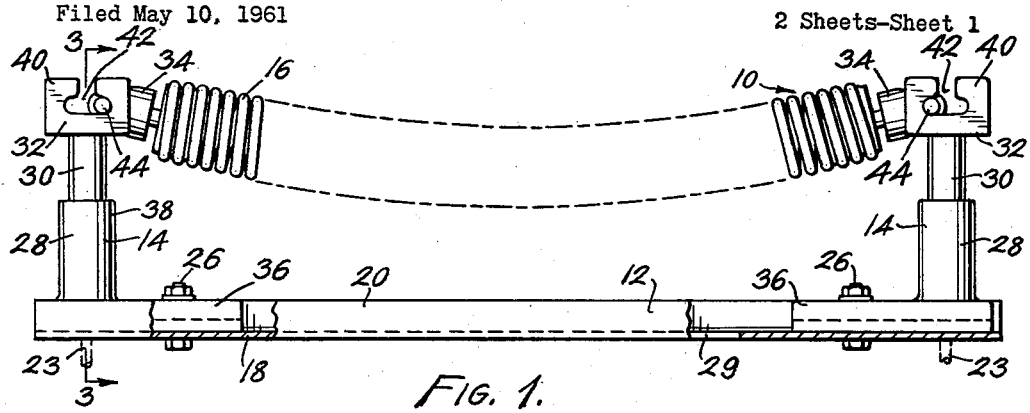
FIGURE 1 is a front elevation showing the improved idler support structure of the present invention as used with a close-wound helical spring idler, portions of the base having been broken away to expose the interior construction.
Figure 2:
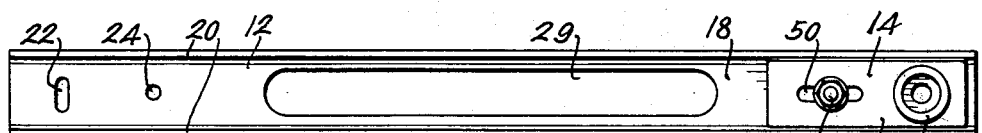
FIGURE 2 is a top plan view of the base and one of the adjustable brackets of the upright post-support unit.
Figures 3, 4:
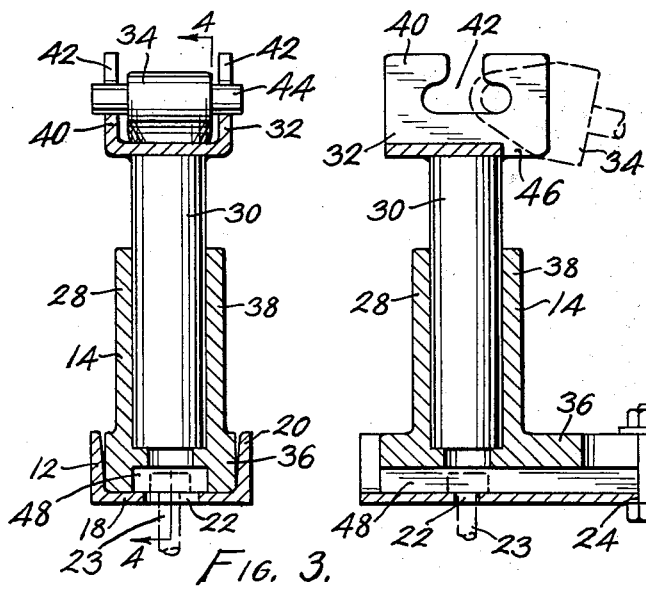
FIGURE 3 is a section taken along line 3—3 of FIGURE 1 showing the details of the upright post-support unit to an enlarged scale.
FIGURE 4 is a fragmentary section taken along line 4—4 of FIGURE 3.

Referring now to the drawings for a detailed description of the belt conveyor idler assembly of the present invention and, more particularly, to FIGURES 1 and 2 for this purpose, it will be noted that said assembly which has been identified broadly by numeral 10 comprises a frame element 12 on the ends of which are adjustably mounted a pair of upright post support elements 14 carrying one of the standard types of flexible idler units 16 suspended therebetween. In the particular form illustrated herein, the frame element 12 constitutes an upwardly opening channel having a web portion 18 bordered by spaced substantially parallel flanges 20 extending along the side margins thereof. Transverse slots 22 located in opposite ends of the web portion of the frame element receive the fasteners 23 that are used to attach the idler assembly to the side rails of the conveyor frame. These slots provide for some adjustment of frame element 12 relative to the side frame elements of the conveyor frame so that the idlers will be located substantially perpendicular to the axis of movement of the belt. Apertures 24 in the web of element 12, on the other hand, receive the tie-down bolts 26 by which the brackets 28 of the upright post support elements are fastened in adjusted spaced relation. The large elongate central opening 29 provides means whereby the close-wound helical spring idler unit 16 of FIGURES 1 and 2 can sag under heavily loaded conditions below the plane of the web 18 of element 12. Opening 29 also provides means adapted to allow any spilled material to drop through the idler assembly so that it will not build up on frame element 12 and foul the idler unit or bearings.

Now, in FIGURES 1-4, inclusive, of the drawings it can be seen that the upright post support elements 14 are identical to one another and include, in addition to bracket 28, a post 30 that terminates at its upper extremity in a clevis 32 adapted to detachably receive the connector 34 on the end of the idler unit 16. Bracket 28 is formed to provide a base 36 adapted to slide longitudinally along the web and between the flanges of channel-shaped frame element 12, and an upstanding tubular portion 38 sized to receive the post 30. There is no disadvantage and, in fact, it is somewhat desirable to have the post 30 rotatable within the tubular portion 38 of bracket 28 thus providing a self-aligning structure supporting the idler unit. Also, there is no necessity for securing the post element 30 within the associated tubular portion 38 of the bracket as the weight of the belt, idlers and material being conveyed are entirely adequate to maintain these elements in assembled relation.

The length of post 30 is selected during manufacture to provide the desired clearance of the belt and idlers above the frame element 12 at the trough angle to be used; hence, a telescopic adjustment of the post within the tubular portion of the bracket is not necessary although it could be used. The clevis 32 atop the post comprises a short upwardly opening channel-shaped element having the side flanges 40 thereof provided with inverted T-shaped slots 42 adapted to releasably receive the pin 44 of connector 34. Of course, the slots 42 could also be L-shaped and perform the same function provided the clevis were properly oriented relative to the idler unit 16. Note also that in the preferred construction of the clevis best seen in FIGURE 4 that the base is cut away along the inside edge to provide an opening 46 adapted to pass the connector 34 of the idler unit 16 in instances where deep troughing of the belt is likely to be used. The weight of the belt and material conveyed thereon will, of course, be effective to maintain the pin 44 of the connector locked within the undercut portion of notch 42 in the clevis.

The tubular portion 38 of bracket is preferably positioned adjacent the outboard edge of the base 36 as shown and may be formed integrally with the latter. The underside of the base portion 36 of bracket 14 is provided with a longitudinal groove 48 located and adapted to receive the head of the frame element tie-down bolt 23 while permitting relative slidable movement between the bracket and frame element for adjustment purposes. Obviously, a stud could be welded onto the underside of frame element 18 thus eliminating the need for groove 48 in the base of bracket 28; however, such a construction is somewhat less desirable from the standpoint of aligning the idler supporting frame with the side rails of the conveyor frame.

An elongate longitudinal adjustment slot 50 is also provided in the base of the bracket 28 overlying aperture 24 in the frame element 12. Fastener 26 passes through slot 50 and aperture 24 for purposes of maintaining the post support assembly 14 in adjusted longitudinal position relative to frame element 12. While other prior art idler support assemblies have provided means by which the distance separating the posts carrying the idler unit could be varied to change the trough depth of the belt, these prior art structures usually accomplished this adjustment by tilting one of the posts relative to the other which, of course, resulted in the pivotal connections between the idler unit and posts being out of horizontal alignment. The net effect was to cause the belt to move or fall off toward one side of the idler assembly or the other due to the tilt imparted to the idler unit. The more heavily the belt was loaded the more pronounced this problem became. With the instant unit, on the other hand, both post support elements 14 remain vertical and are preferably both adjusted relative to the center of the frame to keep the belt centered. Obviously, there are a number of different methods that could be used to locate the positions of the post support elements relative to the ends of frame element 12 in order to produce the desired trough depth in the belt; however, the system outlined in FIGURES 7 and 8, to which reference will now be made has certain advantages which are not found in other systems.

Frame element 12b of FIGURE 7 is modified slightly over that shown in FIGURES 1 and 2 by eliminating the large elongate opening 29 and substituting therefor a small positioning hole 52 located midway between the ends of element 12b. This hole 52 receives a positioning pin 54 of a gage block 56 that is shown most clearly in FIGURE 8. With the pin 54 located in hole 52, the distance separating the pin from the far end 58 of the gage block is selected such as to accurately locate the past support elements 14 on the frame element 12 in proper position to produce the desired trough depth in the belt. Because of the infinite number of adjusted positions of the post support elements that can be attained within the limits of slot 50, a variable-length gage block, such as one having a plurality of pin positions, is deemed impractical; therefore, the gage block is preferably cut to the pre-selected length required to produce a given trough depth for each different material handling problem as there will likely be only two or three needed at the most for a particular conveyor.

An incidental, but important, function of the gage block 56 is that which has been illustrated in FIGURE 7, namely, as a means providing a fulcrum about which one of the post support elements 14 can be tilted toward the other without changing the spacing therebetween while the idler unit 16 is removed and repaired or replaced. In other words, when the idler assemblies are loaded with the belt and perhaps some of the material being conveyed, it becomes a difficult job to disconnect the idler unit from the associated post support elements especially in those conveyors employing a shallow trough depth or those using helical springs under some tension load. Accordingly, by putting the gage block in place as shown in FIGURE 7 and releasing the tie-down bolt 26 of the abutting post support element, the latter can rock inwardly about the end 58 of the gage block as a fulcrum to slack off on the idler unit and enable it to be removed.

The gage block assumes even greater importance in reassembling the idler assembly as it provides a properly positioned stop about which the loosened post-support element can be rocked back into vertical position. Without the gauge block it would, of course, be difficult to pull the post-support unit down and out into its correct adjusted position with the idler unit already connected thereto. Similarly, releasing and reattaching the idler unit without loosening the post-support unit is equally difficult, if not more so, and may be impossible with a tightly stretched idler.

Figure 5:
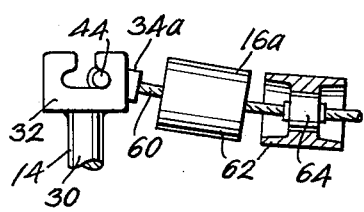
FIGURE 5 is a fragmentary detail to the same scale as FIGURES 1 and 2 illustrating the use of the invention with a cable-type idler having rollers journalled for rotation on the cable.
Figure 6:
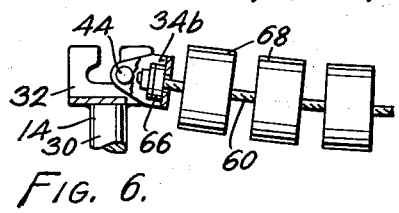
FIGURE 6 is a fragmentary detail similar to FIGURE 5 except that the cable-type idler has the rollers fixed to the cable and the latter journalled for rotation at its points of attachment to the upright post supports.

Before describing the modification of FIGURES 9 and 10, it will be well to refer briefly to FIGURES 5 and 6 which are included to illustrate the use of the idler support assembly of the present invention with the flexible cable types of idler units. In FIGURE 5, idler unit 16a has the connector 34a swaged or otherwise non-rotatably attached to the end of cable 60; whereas, the rollers 62 are journalled for rotation on the cable by means of suitable bearings 64. In the modification of FIGURE 6, on the other hand, cable 60 is journalled for rotation within bearings 66 carried by the connector 34b while the rollers 68 are mounted non-rotatably on the cable. In both instances, however, the identical post-support unit 14 can be employed that is used with the close-wound helical spring type flexible idler of FIGURES 1 and 7.

Finally with reference to FIGURES 9 and 10 wherein a further modification of the idler support assembly of the present invention has been illustrated, it will be seen to be one in which the post-support elements 14a are resiliently mounted on the modified frame element 12a to provide a shock-absorbent assembly particularly suited for use at loading stations with one of the cable-type idler units, the spring-type idler unit obviously requiring no shock-mounting. Here the flanges 20a of the frame element 12a are each provided with two pairs of horizontally-spaced and transversely aligned apertures located at opposite ends thereof in position to receive fasteners 70 that hold sideplates 72 in longitudinal adjusted position thereon. These sideplates have a horizontal slot 74 therein which, when the fasteners pass therethrough, provide for horizontal adjustment of the plates relative to the frame element yet prevent relative tiltable movement therebetween. The upper edge of the sideplates is provided with an inverted T-shaped slot 76 adapted to releasably receive pins 78 projecting from the sides of the base 36a of bracket element 28a for relative tiltable movement. The base 36a is modified to eliminate longitudinal groove 48 and slot 50 which are not required while substituting a downwardly projecting aligning pin 80 located inwardly of pivot pins 78. A compression spring 82 is mounted on pin 80 and rests on the web 18a of frame element 12a.

Adjustment of the post support elements 14a is accomplished by loosening fasteners 70 and sliding the sideplates endwise within the limits of slots 74; whereupon the fasteners are retightened to maintain the desired adjusted position. Pins 78 within the undercut portion of inverted T-shaped slots 76 provide pivotal connections about which the post-support elements can tilt toward one another when an impact load is impressed thereupon. Ideally, the stiffness of springs 82 is selected such that the normal belt loading will not appreciably compress same; otherwise, the trough depth of the belt would be most difficult to maintain. Note that the lower end of springs 82 is not secured to the web 18a of frame element 12a, but rather, merely rests thereon in any of its adjusted positions.

Having thus described the several useful and novel features of the idler support assembly of the present invention it will be apparent that the several worthwhile objectives for which it was designed have been achieved. Although but a few specific embodiments of the invention have been illustrated and described in connection with the accompanying drawings, I realize that certain changes and further modifications therein may well occur to those skilled in the art within the broad teaching hereof; hence, it is my intention that the scope of production afforded hereby shall be limited only insofar as said limitations are expressly set forth in the appended claims.

What is claimed is:

1. A support assembly for flexible belt conveyor idlers which comprises, an elongate rigid cross frame element of a belt conveyor frame and a pair of upright post support units attached at opposite ends of the cross frame element for independent adjustable movement in the direction of the length thereof to vary the spacing therebetween while maintaining substantially the same angular relation thereto, each of said post support units including a bracket element, a post element and a clevis, the bracket having a base portion supported on the cross frame element and a socket-forming portion projecting upwardly from said base portion which receives the post element telescopically in axial alignment therewith, the clevis being mounted on top of the post element and adapted to releasably receive the connector on the end of a flexible idler unit suspended between the post support units for pivotal movement, the cross frame element being generally channel-shaped having a web and upstanding flanges bordering the side margins of the latter, a pair of sideplates attached to the upstanding flanges of the cross frame element in transversely aligned relation on each end thereof for longitudinal non-tiltable movement relative thereto, said sideplates each having an inwardly undercut upwardly opening slot in the top edge thereof, a transverse pivot pin carried by the base of each post-support unit and mounted within the undercut portion of the slot in the sideplates providing a longitudinally adjustable pivotal connection between the cross frame element and said post support units, and a compression spring positioned between the web of the cross frame element and the base of each post support unit spaced inwardly from the pivotal connection therebetween providing a shock-absorbent mounting for the idler unit.

2. The support assembly as set forth in claim 1 in which one of said elements comprising the upstanding flanges of the cross frame element and the sideplates is provided with a horizontal slot while the other contains horizontally-spaced apertures aligned with said horizontal slot, and in which a pair of fasteners pass through said horizontally spaced apertures and horizontal slot connecting the sideplates to the cross frame element for longitudinal adjustable movement.

3. The support assembly as set forth in claim 1 in which a pin depends from the underside of the bracket base spaced inwardly from the pivot pins and forms a mounting for the compression spring.

4. The support assembly as set forth in claim 1 in which the web of the cross frame element is provided with transverse slots adjacent the ends thereof adapted to receive fasteners adjustably mounting the assembly to the side rails of the conveyor frame.

5. The support assembly as set forth in claim 1 in which the compression springs are of a stiffness adapted to support normal conveyor loads without allowing the post support units to tilt from an essentially vertical position while yielding upon the application of an impact load to the idler unit supported thereby.

References Cited in the file of this patent

UNITED STATES PATENTS

| | | |
|---|---|---|
| 987,157 | Messiter | Mar. 21, 1911 |
| 1,355,488 | McKenney | Oct. 12, 1920 |
| 2,908,958 | Arndt | Oct. 20, 1959 |
| 2,974,777 | Marsh | Mar. 14, 1961 |
| 2,983,364 | Lo Presti | May 9, 1961 |

FOREIGN PATENTS

| | | |
|---|---|---|
| 669,534 | Germany | Dec. 8, 1938 |
| 695,888 | Germany | Sept. 5, 1940 |
| 811,287 | Great Britain | Apr. 2, 1959 |